United States Patent [19]

Boser

[11] Patent Number: 5,271,090
[45] Date of Patent: Dec. 14, 1993

[54] OPERATIONAL SPEED IMPROVEMENT FOR NEURAL NETWORK

[75] Inventor: Bernhard Boser, Locust, N.J.

[73] Assignee: AT&T Bell Laboratories, Murray Hill, N.J.

[21] Appl. No.: 845,753

[22] Filed: Mar. 2, 1992

Related U.S. Application Data

[63] Continuation of Ser. No. 496,736, Mar. 21, 1990, abandoned.

[51] Int. Cl.$^5$ .............................................. G06F 15/18
[52] U.S. Cl. .......................................... 395/21; 395/23
[58] Field of Search .............................. 395/23, 24, 27

[56] References Cited

U.S. PATENT DOCUMENTS

| | | | |
|---|---|---|---|
| 4,777,613 | 10/1988 | Shahan et al. | 364/200 |
| 4,870,606 | 9/1989 | Sasahara | 364/729 |
| 4,893,255 | 1/1990 | Tomlinson, Jr. | 364/513 |
| 4,899,302 | 2/1990 | Nakayama | 364/729 |
| 4,912,649 | 3/1990 | Wood | 364/513 |
| 4,941,122 | 7/1990 | Werdeman | 364/807 |
| 5,067,164 | 11/1991 | Denker et al. | 382/15 |

OTHER PUBLICATIONS

McClelland et al., Explorations in Parallel Distributed Processing, MIT Press, 1988, pp. 1-3, 68-75, 97-108, 121-150, 246, 251.

Fu et al., "A Universal Digital VLSI Design for Neural Networks", IJCNN, Jun. 1989.

Kung, S. Y., Hwang J. N., "A Unifying Algorithm/Architecture for Artificial Neural Networks", from Intl. Conf. on Acoustics, Speech, and Signal Processing, vol. 4, 1989, pp. 2505-2508.

Guez, A. et al., "On the Stability, Storage Capacity, and Design of Nonlinear Continuous Neural Networks", from IEEE Transactions on Systems, Man, and Cybernetics, vol. 18 No. 1, 1988, pp. 80-87.

D. E. Rumelhart et al., Parallel Distr. Proc.: Explorations in Microstructure of Cognition, vol. 1, 1986, "Learning Internal Representations by Error Propagation", pp. 318-362.

R. P. Lippmann, IEEE ASSP Magazine, vol. 4, No. 2, Apr. 1987, "An Introduction to Computing with Neural Nets":, pp. 4-22.

Y. LeCun, Connectionism in Perspective, R. Pfeifer, Z. Schreter, F. Fogelman, L. Steels, (Eds.), 1989, "Generalization and Network Design Strategies", pp. 143-155.

Y. LeCun et al., IEEE Comm Magazine, Nov. 1989, "Handwritten Digit Recognition: Applications of Neural . . . ", pp. 41-46.

Primary Examiner—Michael R. Fleming
Assistant Examiner—Robert W. Downs
Attorney, Agent, or Firm—Gregory C. Ranieri

[57] ABSTRACT

Higher operational speed is obtained without sacrificing computational accuracy and reliability in a neural network by interchanging a computationally complex nonlinear function with a similar but less complex nonlinear function in each neuron or computational element after each neuron of the network has been trained by an appropriate training algorithm for the classifying problem addressed by the neural network. In one exemplary embodiment, a hyperbolic tangent function is replaced by a piecewise linear threshold logic function.

17 Claims, 5 Drawing Sheets

OPERATIONAL SPEED IMPROVEMENT FOR NEURAL NETWORK

This application is a continuation of application Ser. No. 07/496,736, filed on Mar. 21, 1990, now abandoned.

TECHNICAL FIELD

This invention relates to the field of pattern recognition and, more particularly, to computational elements in neural networks.

BACKGROUND OF THE INVENTION

Computer-based information gathering, handling, manipulation, storage, and transmission have fostered the growth and acceptance of computation systems based upon adaptive learning with various neural network architectures. These computation systems are commonly called automatic learning networks, neural networks, hierarchically layered networks, and massively parallel computation networks. Applications of the computational systems represent potentially efficient approaches to solving problems such as providing automatic recognition, analysis and classification of character patterns in a particular image. In measuring the value of such applied systems, it is necessary to focus on two key operational parameters relative to conventional approaches. The parameters are speed and accuracy.

Accuracy of the systems has been improved steadily by employing more complex architectures, more extensive training routines, and multi-valued intermediate decision levels (e.g., gray scale encoding). Unfortunately, improvements to obtain greater system accuracy tend to adversely impact the speed of the system.

Since most systems are based on implementations using a general or special-purpose processor, complexity and rigorousness of such an implementation is generally translatable into additional program steps for the processor. In turn, the response of the processor is slowed by an amount commensurate with the additional number of program steps to be performed. As a result, faster, more effective neural network computation systems appear realizable only by replacement of the processor with a faster and equally, or more, accurate processor.

SUMMARY OF THE INVENTION

Higher operational speed is obtained with reduced computational complexity without sacrificing quality, accuracy and reliability of the result in a neural network by training a plurality of neurons (computational elements) in the neural network while a computationally complex nonlinear squashing function is employed in each neuron or computational element to determine accurate weights for each neuron, replacing the computationally complex nonlinear squashing function with a less complex nonlinear squashing function, and classifying data presented to the neural network with the less complex nonlinear squashing function employed in each neuron of the neural network. Replacement of the computationally complex nonlinear squashing function with the less complex nonlinear function permits a savings in computation to be realized for the neural network at each neuron.

In one embodiment, a differentiable nonlinear function such as a hyperbolic tangent is replaced by a piecewise linear threshold logic function. Differentiable nonlinear functions are required for certain well known training criteria such as back propagation.

In another embodiment, each neuron or computational element of the neural network includes several nonlinear function elements representing nonlinear squashing functions of varying degrees of complexity. The elements are controllably switched into, and out of, operation during training and classifying operational phases in accordance with the principles of the invention.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

In the description below, pattern recognition and, particularly, optical character recognition are presented as applicable areas for the present invention. Such an example is meant for purposes of explication and not for purposes of limitation. It is contemplated that the present invention be applied also to areas such as speech processing and recognition, automatic control systems, and other artificial intelligence or automatic learning networks which fall within the realm commonly called neural networks. Hereinafter, the term "neural network" is understood to refer generically to all such networks.

Figure 1:
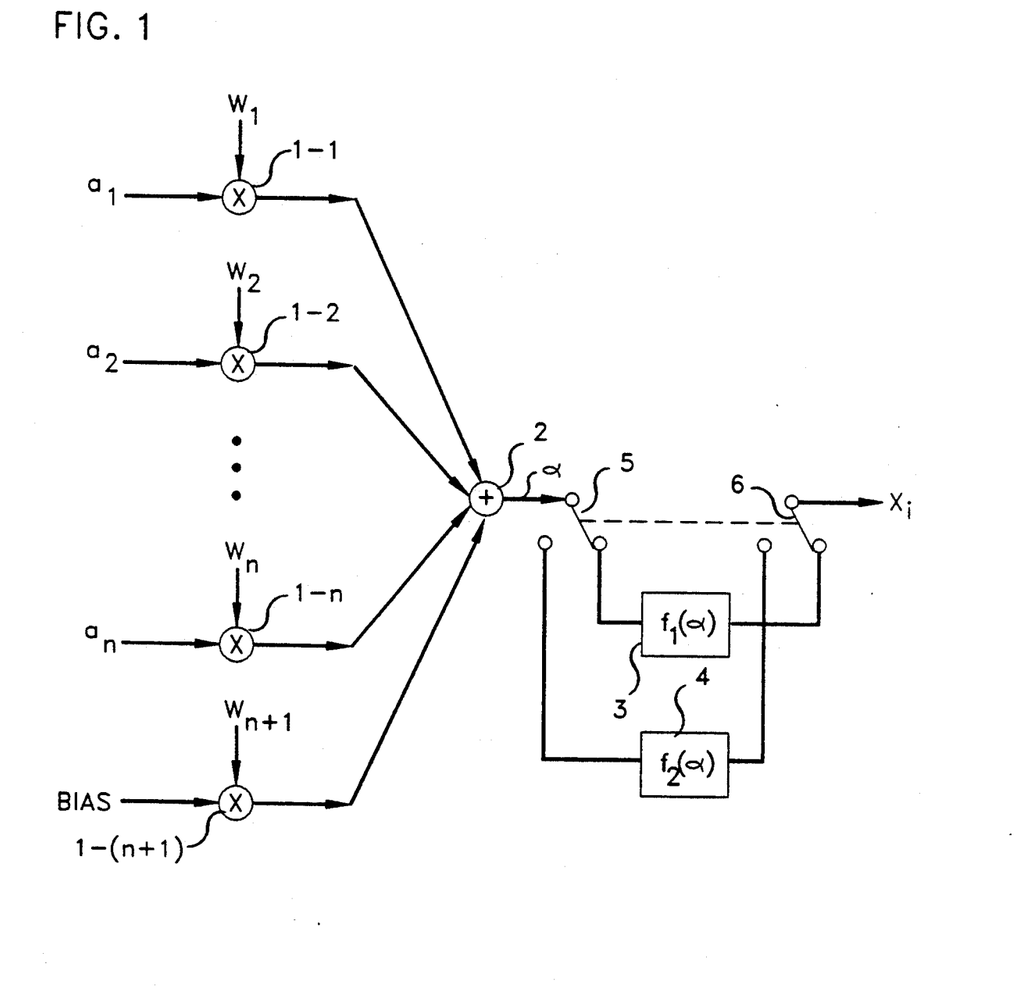
FIGS. 1 and 2 are simplified block diagrams for alternative individual computational elements in a learning or neural network in accordance with the principles of the invention.
Figure 2:
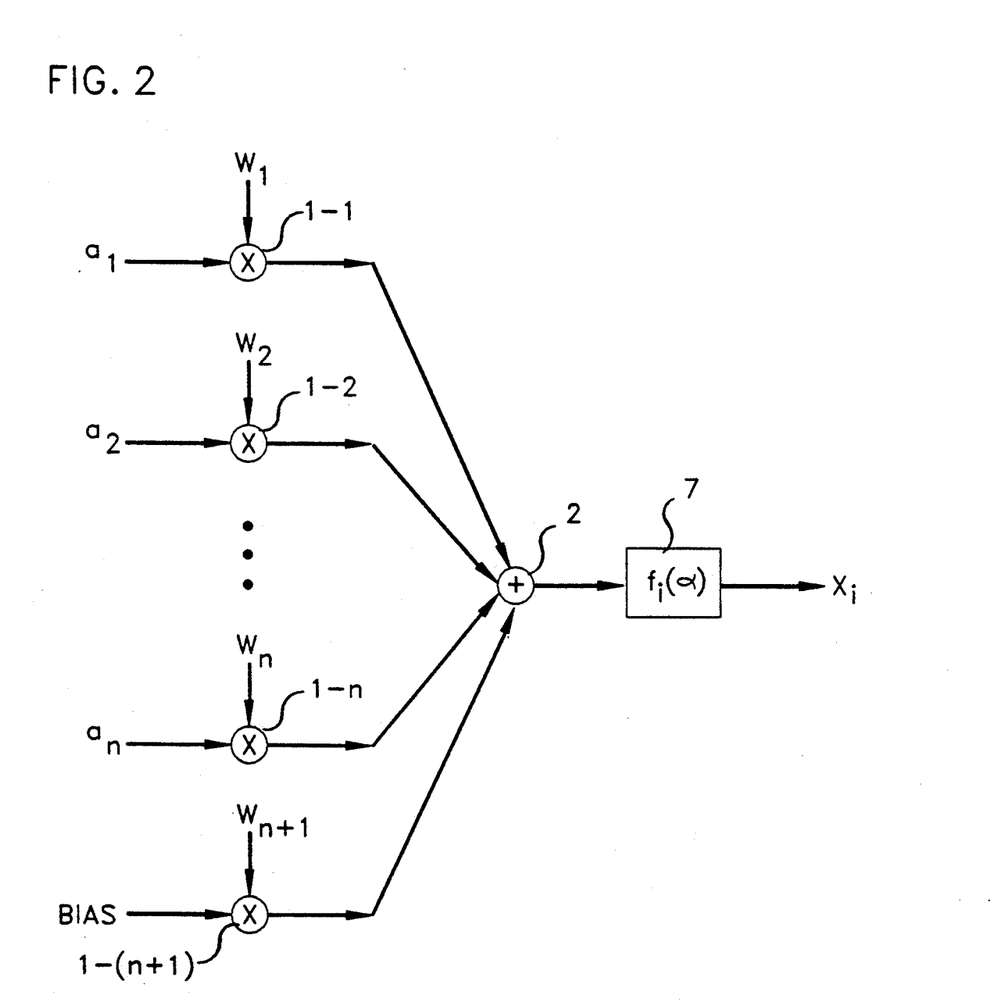

Computational elements as shown in FIGS. 1 and 2 form the fundamental functional and connectionist blocks for most neural or learning networks. In general, a computational element forms a weighted sum of input values for $n+1$ inputs and passes the result through a nonlinearity $f(\alpha)$, where $\alpha$ is the input to the nonlinear function, to arrive at a single value. The nonlinearity is often termed a nonlinear squashing function and includes functions such as hard limiter functions, threshold logic element functions, and sigmoidal functions, for example, as shown in FIGS. 3 through 7. Input and output values for the computational element may be analog, quasi-analog such as multi-level and gray scale, or binary in nature.

In operation, the computational element shown in FIGS. 1 and 2 scans n different inputs which, during an exemplary operation such as optical character recognition, may be neighboring input pixels, pixel values or unit values from an image or feature map. These inputs have values represented as $a_1, a_2 \ldots, a_n$. An input bias is supplied to an $n+1$ input of a computational element. For simplicity, the bias is generally set to a constant value such as 1. The inputs and the bias are supplied to multipliers 1-1 through 1-$(n+1)$. The multipliers accept another input from a weight vector having weights $w_1$ through $w_{n+1}$. Outputs from all multipliers are supplied to adder 2 which generates the weighted sum of the input values. As such, the output from adder 2 is simply the dot product of a vector of input values (including a bias value) with a vector representing the weights. The output value from adder 2 is passed through the nonlinear function to generate a single unit output value $x_i$. As will be understood more clearly below, unit output value $x_i$ is related to the value of the $i^{th}$ unit in the feature map under consideration.

A first nonlinear function is used during the training phase of neural network operation to establish values of the weight vector by a standard training algorithm such as backward propagation or the like. During a non-training phase such as a classification or recognition phase, a second nonlinear function is used by the neural network. In accordance with principles of the present invention, the second nonlinear function is less computationally complex than the first nonlinear function.

Computational complexity is understood to mean that the computation necessary to achieve a result for the nonlinear function $f(\alpha)$ are simpler and, most probably, fewer in number for the second nonlinear function as compared with the first nonlinear function. This will become more clear with the description of FIGS. 3 through 7 below. By requiring lower computational complexity for the nonlinearity during a non-training phase, one can readily see that each computational element operates faster during a non-training operational phase than each corresponding computational element using the first nonlinear function during training operational phase.

Figure 3:
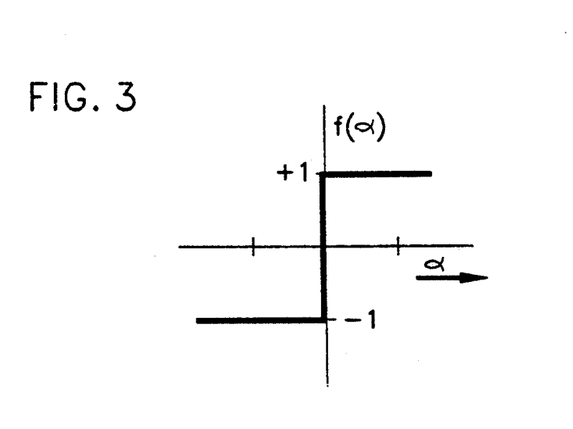
FIGS. 3 through 7 show exemplary graphical representations of different nonlinear functions employed by the computational elements in FIGS. 1 and 2.
Figure 4:
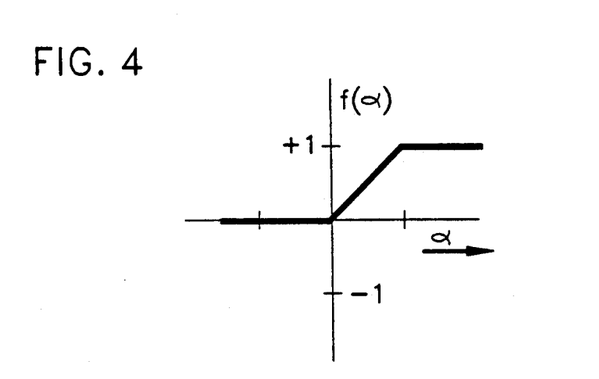
Figure 5:
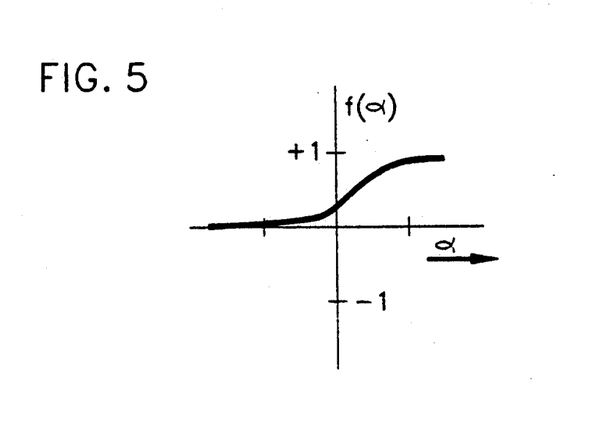
Figure 6:
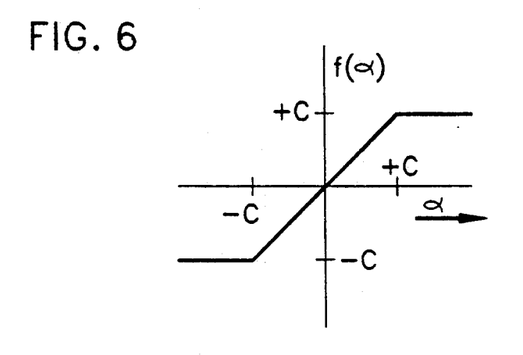
Figure 7:
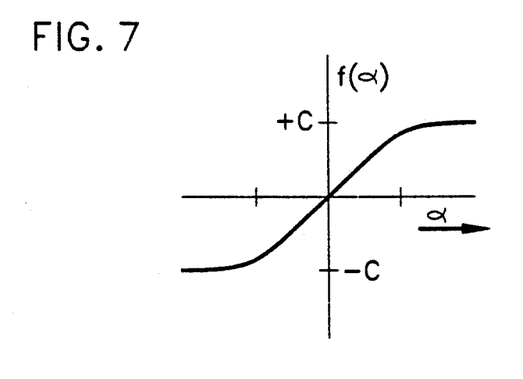

Computational complexity is perhaps best understood with reference to FIGS. 3 through 7. FIGS. 5 and 7 are continuous nonlinear functions having a high degree of computational complexity relative to the piecewise linear or quasi-continuous functions shown in FIGS. 3, 4, and 6. In accordance with the principles of this invention, a computationally complex nonlinear function (e.g., FIGS. 5 and 7) is employed during the training phase to establish values for each weight vector entry. After the weight vector values are set, a computationally simpler nonlinear function (e.g., FIGS. 3, 4, and 6) replaces the computationally complex function.

Continuous nonlinear functions such as shown in FIGS. 5 and 7 require a significant amount of computing to determine $f(\alpha)$ for a given $\alpha$. Hence, they are computationally complex. It should be noted that these functions are asymptotic along both horizontal axes.

Less complex functions shown in FIGS. 3, 4, and 6 require much less computing to determine the value of $F(\alpha)$. A hard limiter function shown in FIG. 3 minimally approximates the more complex nonlinear function in FIG. 7. A much closer approximation for the function in FIG. 7 is shown in FIG. 6, which is a piecewise linear threshold logic function. The latter function is known as a piecewise linear function because it comprises a number of linear pieces to complete the entire function. While the breakpoints are shown to occur at a point of equality for the ordinate and abscissa, other relationships are contemplated so that the slope of the line may be changed or the curve may be shifted left or right and the like.

While a number of different nonlinear functions of varying computational complexity have been shown in FIGS. 3 through 7, many other nonlinear functions are contemplated for use in the present invention. For example, a Taylor series approximation of a particular nonlinear squashing function may be employed as the computationally complex nonlinear function. An accurate Taylor series approximation of the hyperbolic tangent function is given below as:

$$\tanh(x) \simeq \sum_{i=0}^{n} a_i x^i,$$

where n is a large integer and $a_i$ are constant coefficients. A nonlinear function having reduced computational complexity which may be substituted for the accurate Taylor series expansion described above is given as:

$$\tanh(x) \simeq \sum_{i=0}^{m} a_i x^i,$$

where m is a small integer such that $m << n$.

It may be desirable to choose a less computationally complex function, $f_2(\alpha)$, to replace the more computationally complex nonlinear function, $f_1(\alpha)$, where $f_2(\alpha)$ is a fairly good approximation of $f_1(\alpha)$. However, it is contemplated that any less complex function may be used to replace any more complex function where there is little or no relationship between the two functions.

As shown in FIG. 1, the computationally complex nonlinear function 3, $f_1(\alpha)$, which is used during the training phase, is controllably switched out of operation for the computational element by switches 5 and 6. When the network is in a non-training phase, the less complex nonlinear function 4, $f_2(\alpha)$, is connected into operation for the computation element.

Variations of the switch configuration shown in FIG. 1 have been contemplated. Such variations include connecting the output $x_i$ to each of nonlinearity 3 and 4 and using switch 5 to direct the data to the correct nonlinear function for the particular operational phase of the neural network. Another variation includes connecting the input to each of nonlinearity 3 and 4 and operating switch 6 to select the proper nonlinear function for the particular operational phase.

In FIG. 2, a single nonlinearity 7 is shown in which the nonlinear function, $f_i(alpha)$, is evaluated for a given $\alpha$ where the function subscript i is 1 for a computationally complex nonlinear function and 2 for a nonlinear function of lesser computational complexity. This arrangement requires fewer parts than the computational element in FIG. 1 but it is isomorphic with the arrangement shown in FIG. 1.

In an example from experimental practice, an exemplary sigmoidal function for computationally complex nonlinearity 3 in FIG. 1 is chosen for the training phase as a scaled hyperbolic tangent function, $f_1(\alpha) = c \cdot \tanh(S\alpha)$, where $\alpha$ is the weighted sum input to the nonlinearity, c is the amplitude of the function, and S determines the slope of the function at the origin. As described above and shown in FIG. 7, the nonlinearity is an odd function with horizontal asymptotes at $+c$ and $-c$. It is understood that nonlinear functions exhibiting an odd symmetry are believed to yield faster convergence of the weight vector elements, $w_1$ through $w_{n+1}$, during learning or training.

Weights for each computational element in a learning network are obtained using a standard training algorithm. One such training algorithm is a trial and error learning technique known as back propagation. See Rumelhart et al., "Learning Internal Representation by Error Propagation", in *Parallel Distributed Processing: Explorations in the Microstructure of Cognition*, Volume I, pp. 319-364 (Cambridge, Mass.: Bradford Books) or see R. P. Lippmann, "An Introduction to Computing with Neural Nets", *IEEE ASSP Magazine*, Vol. 4, No. 2, pp. 4-22 (1987). The teachings in both references with respect to automatic learning are expressly incorporated herein by reference. Prior to training, each of weight is initialized to a random value using a uniform distribution between, for example, $-2.4/F_i$ and $2.4/F_i$ where $F_i$ is the number of inputs (fan-in) of the unit to which the connection belongs. For the example shown in FIG. 1, the fan-in $F_i$ is equal to $n+1$. By using this initialization technique, it is possible to maintain values within the operating range of the sigmoid nonlinearity. During training, image patterns are presented in a constant order. Weights are updated according to the stochastic gradient or "on-line" procedure after each presentation of a single image pattern for recognition. A true gradient procedure may be employed for updating so that averaging takes place over the entire training set before weights are updated. It is understood that the stochastic gradient is found to cause weights to converge faster than the true gradient especially for large, redundant image data bases.

Realization of the computational elements and, for that matter, entire networks may be in hardware or software or some convenient combination of hardware and software. Much of the network presented herein has been implemented using an AT&T DSP 32C digital signal processor with simple programs performing the rudimentary mathematical operations of addition, subtraction, multiplication, and comparison. Pipelined devices, microprocessors, and special purpose digital signal processors also provide convenient architectures for realizing the network in accordance with the principles of the invention. MOS VLSI technology has also been employed to implement particular weighted interconnection networks of the type shown in FIG. 8. Local memory is desirable to store pixel and unit values and other temporary computation results.

Each pixel has a value associated therewith which corresponds to the light intensity or color or the like emanating from that small area on the visual character image. The values of the pixels are then stored in the memory devices. When reference is made to a particular map, it is understood that the term "pixel" and "unit value(s)" are used interchangeably and include pixels, pixel values and unit values output from each computation element combining to form the map array. It may be more convenient to think in terms of planes or 2-dimensional arrays (maps) of pixels rather than pixel values or unit values for visualizing and developing an understanding of network operation.

Standard techniques are employed to convert a handwritten character to the pixel array which forms the supplied character image. The character image may be obtained through electronic transmission from a remote location or it may be obtained locally with a scanning camera or other scanning device. Regardless of its source and in accordance with conventional practice, the character image is represented by an ordered collection of pixels. The ordered collection is typically an array. Once represented, the character image is generally captured and stored in an optical memory device or an electronic memory device such as a frame buffer.

Various other preprocessing techniques used to prepare a character image as a pixel array for character recognition may include various transformations such as scaling, size normalization, deskewing, centering, and translation or shifting, all of which are well known to those skilled in the art. In addition, transformation from the handwritten character to a gray scale pixel array may be desirable to preserve information which would otherwise be irretrievably lost during preprocessing. The latter transformation is understood to be well known to those skilled in the art.

In addition to the operations listed above for preparation of the image for character recognition, it is generally desirable to provide a uniform, substantially constant level border around the original image.

Figure 8:
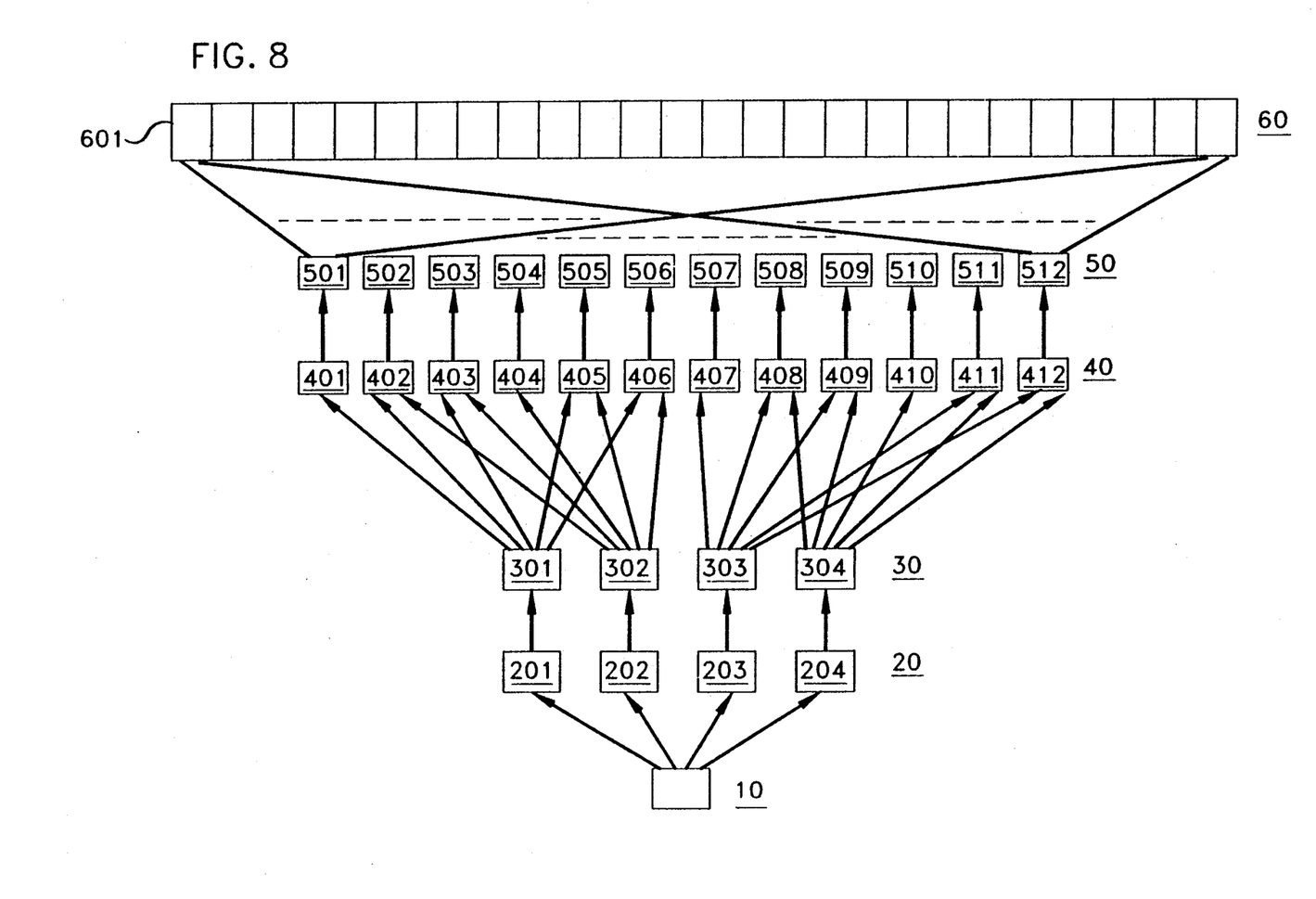
FIG. 8 shows a simplified block diagram of an exemplary hierarchical automatic learning network in the prior art.

FIG. 8 shows a simplified block diagram of an exemplary embodiment for a hierarchical constrained automatic learning network which can include computational elements realized in accordance with the principles of the invention. This network has been described in commonly assigned and co-pending U.S. patent application Ser. No. 444,455 filed Nov. 30, 1989. The teachings in the application cited immediately above are expressly incorporated herein by reference. The network performs character recognition from a supplied image via massively parallel computations. Each array (box) shown in levels 20 through 60 is understood to comprise a plurality of computational elements, one per array unit.

The network shown in FIG. 8 comprises first and second feature detection layers and a character classification layer. Each layer comprises one or more feature maps or arrays of varying size. In most conventional applications, the maps are square. However, rectangular and other symmetric and non-symmetric or irregular map patterns are contemplated. The arrangement of detected features is referred to as a map because an array is constructed in the memory device where the pixels (unit values) are stored and feature detections from one lower level map are placed in the appropriate locations in the array for that map. As such, the presence or substantial presence (using gray scale levels) of a feature and its relative location are thus recorded.

The type of feature detected in a map is determined by the weight vector being used. In constrained feature maps, the same weight vector is used for each unit of the same map. That is, a constrained feature map scans a pixel array for the occurrence of the particular feature defined by one particular weight vector. As such, the term "constrained" is understood to convey the condition that computation elements comprising a particular map are forced to share the same set of weight vector. This results in the same feature being detected at different locations in an input image. It is understood that this technique is also known as weight sharing.

For those skilled in the art, it will be understood that the weight vector defines a receptive field (5 pixels × 5 pixels or 2 pixels × 2 pixels) on the plane of the image pixels or map units being detected for occurrence of the feature defined by the weight vector. By placement of the weight vector on a pixel array, it is possible to show what pixels are being input to the computation element in the feature map and which unit on the feature map is being activated. The unit being activated corresponds generally to an approximate location of the feature occurrence in the map under detection.

The first feature detection layer includes a plurality of constrained feature maps 20 and a corresponding plurality of feature reduction maps 30. As shown in the figure, the particular embodiment of the network includes four each of the constrained feature maps and the corresponding feature reduction maps in the first layer.

The second feature detection layer includes a plurality of constrained feature maps 40 and a corresponding plurality of feature reduction maps 50. As shown in the figure, the particular embodiment of the network includes twelve each of the constrained feature maps and the corresponding feature reduction maps in the second layer.

The final layer of the network comprises a character classification layer 60 which is fully connected to all feature reduction maps of the second feature detection layer. The character classification layer generates an indication of the character recognized by the network from the supplied original image. The term "fully connected" is understood to mean that the computation element associated with a pixel in character classification layer 60 receives its input from every pixel or unit included in the preceding layer of maps, that is, layer 50.

Interconnection lines from layer to layer in the network have been drawn to show which maps in a preceding layer provide inputs to each and every computation element whose units form the maps in the layer of interest. For example, constrained feature maps 201 through 204 detect different features from image 10 in the process of generating the constrained feature maps. Proceeding to the next level of maps, it is seen that feature reduction map 301 derives its input solely from the units in constrained feature map 201. Similarly, feature reduction maps 302 through 304 derive their input solely from the units in constrained feature maps 202 through 204, respectively. For the network embodiment shown in FIG. 2, interconnection from the first feature detection layer to the second feature detection layer is somewhat more complicated. Constrained feature maps 401, 404, 407, and 410 derive their inputs solely from units in feature reduction maps 301 through 304, respectively. Constrained feature maps 402, 403, 405, and 406 derive their inputs from combinations of units from feature reduction maps 301 and 302; constrained feature maps 408, 409, 411 and 412 derive their inputs from combinations of units from feature reduction maps 303 and 304. Finally, individual feature reduction maps 501 through 512 derive their inputs solely from units in individual ones of corresponding constrained feature maps 401 through 412, respectively.

It should be noted that the character classification layer 60 includes a sufficient number of elements for the particular character recognition problem being solved by the network. That is, for the recognition of either upper case or lower case Latin alphabetic characters, one exemplary embodiment of layer 60 would include 26 units signifying the letters A through Z or a through z. On the other hand, for the recognition of numeric characters, one embodiment of layer 60 would include only 10 units signifying the numbers 0 through 9.

For convenience and ease of understanding, the bias input to the computational element and its associated weight in the weight vector element shown in FIGS. 1 and 2 have been omitted in the description of the neural network herein. In experimental practice, the bias is set to 1 and its corresponding weight is learned through back propagation.

When computational elements realized in accordance with the principles of the invention are employed in the network shown in FIG. 8 and programmed on an AT&T digital signal processor DSP-32C, the neural network achieved a 100% increase in operational speed for character recognition. The network was trained using a hyperbolic tangent function with back propagation training. The hyperbolic tangent function was replaced by a piecewise linear function during the classification (character recognition) phase. This piecewise linear function is shown in FIG. 6 and expressed as follows:

$$f(a) = \begin{cases} c, & \text{if } a > c \\ -c, & \text{if } a < -c \\ a, & \text{otherwise,} \end{cases}$$

where $a$ is the input to the nonlinearity in the computational element.

I claim:

1. A computational device for use in a neural network having training and recognition modes of operation comprising means jointly responsive to a data input vector and a weight vector for performing a dot product thereof, said weight vector being determined substantially during the training mode in relation to a first nonlinear function, means responsive to an output from said dot product means for squashing said output according to a predetermined nonlinear function to generate an output value for the computational device, switching means responsive to said neural network being in the recognition mode of operation for substituting a second nonlinear function for the first nonlinear function as the predetermined nonlinear function in said squashing means, said second nonlinear function being less computationally complex than said first nonlinear function.

2. The computational device as defined in claim 1 wherein said second nonlinear function is a piecewise linear approximation of said first nonlinear function.

3. The computational device as defined in claim 2 wherein said first nonlinear function is a hyperbolic tangent function.

4. The computational device as defined in claim 3 wherein said second nonlinear function is a piecewise linear function defined as, $$f(x) = \begin{cases} c, & \text{if } x > c \\ -c, & \text{if } x < -c \\ x, & \text{otherwise,} \end{cases}$$

where $x$ is said output.

5. A neural network having training and recognition modes of operation comprising a plurality of computational devices interconnected in a predetermined hierarchical structure to form said neural network, each computational device comprising means jointly responsive to a data input vector and a weight vector for performing a dot product thereof, said weight vector being determined substantially during the training mode in relation to a first nonlinear function, means responsive to an output from said dot product means for squashing said output according to a predetermined nonlinear function to generate an output value for the computational device, switching means responsive to said neural network being in the recognition mode of operation for substituting a second nonlinear function for the first nonlinear function as the predetermined nonlinear function in said squashing means, said second nonlinear function being less computationally complex than said first nonlinear function.

6. The neural network as defined in claim 5 wherein said second nonlinear function is a piecewise linear approximation of said first nonlinear function.

7. The neural network as defined in claim 6 wherein said first nonlinear function is a hyperbolic tangent function.

8. The neural network as defined in claim 7 wherein said second nonlinear function is a piecewise linear function defined as, $$f(x) = \begin{cases} c, & \text{if } x > c \\ -c, & \text{if } x < -c \\ x, & \text{otherwise,} \end{cases}$$

where x is said output.

9. A method for improving a neural network, said neural network comprising a plurality of computational elements, each computational element comprising means responsive to a data input value and a set of weights for squashing said data input value according to a predetermined nonlinear function to generate an output value for the computational element, said method comprising the steps of:

training the neural network in accordance with a predetermined training algorithm while employing said first nonlinear function in each said computational element, substituting a second nonlinear function for a first nonlinear function as the predetermined nonlinear function in each said squashing means when the neural network is operated in a recognition mode of operation, said second nonlinear function being less computationally complex than said first nonlinear function.

10. The method as defined in claim 9 wherein said second nonlinear function is a piecewise linear approximation of said first nonlinear function.

11. The method as defined in claim 10 wherein said first nonlinear function is a hyperbolic tangent function.

12. The method as defined in claim 11 wherein said second nonlinear function is a piecewise linear function defined as, $$f(x) = \begin{cases} c, & \text{if } x > c \\ -c, & \text{if } x < -c \\ x, & \text{otherwise,} \end{cases}$$

where x is said data input value.

13. The method as defined in claim 9 wherein said first nonlinear function is differentiable.

14. The method as defined in claim 13 wherein said predetermined training algorithm is back propagation.

15. The method as defined in claim 14 wherein said second nonlinear function is a piecewise linear approximation of said first nonlinear function.

16. The method as defined in claim 15 wherein said first nonlinear function is a hyperbolic tangent function.

17. The method as defined in claim 16 wherein said second nonlinear function is a piecewise linear function defined as, $$f(x) = \begin{cases} c, & \text{if } x > c \\ -c, & \text{if } x < -c \\ x, & \text{otherwise,} \end{cases}$$

where x is said data input value.

* * * * *